United States Patent
Schriever et al.

(10) Patent No.: US 8,352,057 B2
(45) Date of Patent: Jan. 8, 2013

(54) METHOD FOR OPTIMISING THE LIFE CYCLE OF MEASUREMENT DATA BASED ON THE RETROACTION DURING ASSEMBLING PROCESSES WHILST BEING PRODUCED

(75) Inventors: Henning Schriever, Oldenburg (DE); Erdal Karaca, Oldenburg (DE); Tanja Klostermann, Varel (DE)

(73) Assignee: Airbus Operations GmbH, Hamburg (DE)

( * ) Notice: Subject to any disclaimer, the term of this patent is extended or adjusted under 35 U.S.C. 154(b) by 72 days.

(21) Appl. No.: 12/984,114

(22) Filed: Jan. 4, 2011

(65) Prior Publication Data

US 2011/0208340 A1  Aug. 25, 2011

Related U.S. Application Data

(63) Continuation of application No. PCT/EP2010/054800, filed on Apr. 13, 2010.

(60) Provisional application No. 61/169,891, filed on Apr. 16, 2009.

(30) Foreign Application Priority Data

Apr. 16, 2009   (DE) .......................... 10 2009 002 432

(51) Int. Cl.
   *G06F 19/00*   (2011.01)

(52) U.S. Cl. .............. 700/109; 700/29; 700/98; 700/99; 700/114

(58) Field of Classification Search .................... 700/12, 700/28, 29, 56, 60, 65, 97, 98, 99, 100, 104, 700/108–110, 114, 116, 121, 122, 250
See application file for complete search history.

(56) References Cited

U.S. PATENT DOCUMENTS

| | | | | |
|---|---|---|---|---|
| 5,237,508 | A | * | 8/1993 | Furukawa et al. ............. 700/100 |
| 6,725,184 | B1 | * | 4/2004 | Gadh et al. ......................... 703/2 |
| 2005/0085932 | A1 | * | 4/2005 | Aghababazadeh et al. ..... 700/90 |
| 2006/0080055 | A1 | * | 4/2006 | Kondo et al. ................... 702/84 |

OTHER PUBLICATIONS

Quality Management Systems—Requirements No. EN ISO 9001 dated Dec. 2000.

* cited by examiner

*Primary Examiner* — Sean Shechtman
(74) *Attorney, Agent, or Firm* — Jenkins, Wilson, Taylor & Hunt, P.A.

(57) ABSTRACT

A method for feedback-based optimization of a measurement data life cycle in joining processes during production, comprising the following steps:

1) analysing and simulating production on the basis of assumptions, in particular on the basis of production data, in order to prepare an initial production strategy and/or inspection strategy,
2) preparing and/or adapting a production and/or inspection order,
3) checking the production and/or inspection order for consistency,
4) exporting and storing the production and/or inspection order,
5) aligning and/or joining a component made of at least two sub-assemblies in an assembly zone,
6) analysing and simulating production on the basis of actual measurement results and feedback of an optimized production and/or inspection order into method step 2), and
7) at least one repetition of method steps 2) to 6).

The invention also relates to a device for carrying out the method.

11 Claims, 4 Drawing Sheets

METHOD FOR OPTIMISING THE LIFE CYCLE OF MEASUREMENT DATA BASED ON THE RETROACTION DURING ASSEMBLING PROCESSES WHILST BEING PRODUCED

CROSS-REFERENCE TO RELATED APPLICATIONS

This application is a continuation of PCT/EP2010/054800 filed Apr. 13, 2010 and claims the benefit of U.S. Provisional Application No. 61/169,891, filed Apr. 16, 2009 and German Patent Application No. 10 2009 002 432.8, filed Apr. 16, 2009, the entire disclosures of which are herein incorporated by reference.

FIELD OF THE INVENTION

The invention relates to a method for feedback-based optimisation of a measurement data life cycle in joining processes during production, in particular in the manufacture of aircraft and in general mechanical engineering.

In addition, the invention relates to a device for carrying out the method according to the invention.

A new assembly strategy was introduced when production of the A380 jumbo jet began. Previously, rigid construction devices were used which ensured a high level of accuracy and reproducibility of the components. However, these devices are very cost-intensive and require a lot of space, since a separate device must be provided for each component. Metrological analysis generally took place only in the form of periodical inspection of the construction device.

Various components can be received in the new, more flexible construction devices. This happens during section assembly, for example. In this case, components (shells) prefabricated internally and/or externally are integrated, i.e. aligned and joined together, stepwise in "assembly zones" to form a complete section. The sub-assemblies (for example, structural components such as shells, floor structures or technical system components) are to some extent only received via three receiving points and aligned spatially by corresponding positioners. A plurality of prefabricated fuselage sections of this type are aligned one behind the other in a further assembly zone and subsequently joined together to form a complete fuselage. Systematic deformations, caused by the fitting position and inherent weight of the sub-assemblies, are therefore to be anticipated. Continuous measurement, measurement data management and analysis during production of the components and the construction devices thereof are therefore becoming increasingly important within the context of process control, production and quality assurance, for assessing the reproducibility of the production method and the quality of the components.

Within the context of the sectional construction known from the prior art, assembly zones of this type are usually configured only as "isolated solutions", i.e. the processes taking place in one assembly zone are carried out independently of the processes in further upstream or downstream production stages. However, this procedure has the drawback that results, for example from the measurement of components, cannot be integrated efficiently into the upstream or downstream production processes. As a result, error-prone manual and/or redundant interventions into the production steps being carried out in the assembly zones become necessary, thereby significantly increasing the cost of assembly and impairing productivity and quality. In addition, interface problems between the individual assembly zones lead to losses of information, which often mean that previously accrued data must be input anew in a time-consuming manner in an assembly zone located upstream or downstream.

The lack of a globally networked data management system without media discontinuity in the prior art has the result that no up-to-date information about the respective production status can be retrieved locally and cases where, for example, the tolerance is exceeded during production cannot be detected and rectified. Furthermore, in existing assembly zones there is no automated transmission and further processing of measurement data taking into consideration detected measurement data from previous measurement cycles, which makes stepwise improvement of the production quality between the components to be joined together within the context of sectional construction more difficult.

Owing to the above-mentioned drawbacks, existing production processes for the manufacture of aircraft by sectional construction can only meet future requirements with globally networked production plants to a limited extent.

Growing competition worldwide has led to increasingly high customer expectations with regard to quality. To ensure and increase competitiveness, industrial concerns are increasingly adapting their products to the needs and individual requirements of their customers. In order to remain competitive and maintain good economic capacity, organisations and/or suppliers must use increasingly effective and efficient systems. Such systems should result in continuous improvements in terms of quality and increasing satisfaction of customers and other interested parties of the organisation. In order for such an organisation to function effectively, it must identify, manage and direct numerous interconnected activities. An activity which uses resources and which is carried out to enable inputs to be converted into results can be regarded as a process. The result of one process often forms the direct input for the next. The international standards of the EN ISO 9000 family[1], which are relevant in this case, offer guidelines for a process-oriented approach. Within the context of this application, measuring processes are understood to be special processes which contribute to the improvement of the quality of products produced by an organisation.

[1] EN ISO 9001:1994-EN ISO 9003:1994 are replaced with the publication of EN ISO 9001:2000.

SUMMARY OF THE INVENTION

An object of the invention is to avoid the above-described drawbacks of known production processes and to optimise the joining process during production prior to beginning the production of components by statistically supported analysis and simulation, consistency checks, measurement and alignment of components in line with that aim with subsequent variance comparison, evaluation and feedback of results into the subsequent process cycle. In addition, the feedback mechanism makes it possible gradually to improve the joining process during production, shorten production times and reduce production costs as a result.

The object according to the invention is achieved by a method comprising the following method steps according to claim 1:

1) analysing and simulating production on the basis of assumptions, in particular on the basis of production data, in order to prepare an initial production strategy and/or inspection strategy,
2) preparing and/or adapting a production and/or inspection order,
3) checking the production and/or inspection order for consistency, 4) exporting and storing the production and/or inspection order,
5) aligning and/or joining a component made of at least two sub-assemblies in an assembly zone,
6) analysing and simulating production on the basis of actual measurement results and feedback of an optimised production and/or inspection strategy into method step 2), and
7) at least one repetition of method steps 2) to 6).

As a result of the feedback provided in method step 6), the method consequently makes it possible gradually to minimise in particular tolerance deviations during joining processes over the entire life cycle of the measured values. As a result of the method according to the invention, the transparency of complex production processes, optionally distributed worldwide, during the manufacture of components is improved and at the same time global checking of the respective production status at any time is made possible. In this way, in addition to an improvement in the quality of the produced products, production costs are minimised at the same time.

According to a development of the method, it is provided that the production data include, inter alia, inspection features, measured variables, tolerances and alignment parameters.

This ensures that all parameters which are important for product quality are incorporated into the method according to the invention.

A further advantageous configuration of the method provides that in method step 5a) the sub-assemblies are measured and metrological measured variables obtained therefrom are stored.

As a result of the actual measurement of the sub-assemblies to be joined together, in connection with the feedback of the corrected inspection features and measured variables arising therefrom as well as the optimised tolerance and alignment parameters in method step 6), the production process can be continually monitored and improved on the basis of physical component data.

Further advantageous configurations of the method are set out in the subsequent claims.

In addition, the object according to the invention is achieved by a device having the following features according to claim 16:
a) at least one assembly zone,
b) at least one positioning device for aligning the at least two sub-assemblies,
c) at least one joining device for joining the at least two sub-assemblies,
d) at least one control and/or adjustment device for controlling the at least one positioning device and/or the at least one joining device as a function of the results of the method, and
e) at least one computer unit which is superordinate to the at least one control and/or adjustment device and comprises at least one processor, at least one data memory and at least one central memory.

An assembly zone for carrying out the method is provided with at least one positioning device for aligning the at least two sub-assemblies as well as at least one joining device for joining together the sub-assemblies. In addition, measuring devices, such as laser trackers and/or photogrammetrical measuring devices for automated measurement of the sub-assemblies to be joined together, are provided. Measurement of the sub-assemblies is carried out in method step 5a) by means of the preferably fully automated measuring devices. In addition, manually operated measuring devices can also be provided in the assembly zone.

All of the positioning devices, joining devices and measuring devices are preferably controlled and operated in a fully automated manner by at least one control and/or adjustment device, the control and/or adjustment devices being controlled by the at least one subordinate computer unit. The subordinate computer unit is also responsible for controlling the operation of the method according to the invention. The computer unit also comprises at least one data memory and at least one central memory which can be retrieved locally and, if necessary, also globally by each user of the method to control production flow. The at least one data memory and the at least one central memory may, for example, be organised in the form of a database in such a way that it is possible to retrieve the information contained therein locally by inputting various search criteria.

The superordinate computer unit may be formed using a central computer unit comprising at least one processor and/or by interconnecting a plurality of high-performance, central and/or local computer units which are connected to one another via suitable information transmission channels. The current production status of each component to be joined together from sub-assemblies can be viewed and controlled locally and/or globally by means of suitable monitors connected to the superordinate computer unit.

As a result of the application of the method according to the invention, large-scale sub-assemblies can be integrated in the assembly zone to form finished components with the highest quality standards. Any inaccuracies in the alignment and joining process, which may for example arise as a result of the mass-induced deformation of the positioning devices and/or the sub-assemblies themselves, can be identified by the method and compensated with a lasting effect for later generations of components. In addition, these inaccuracies, which emerge during production and are compensated according to the method, may be taken into account a priori during the design process of future generations of sub-assemblies to be prefabricated. As a result of production according to the method, positioning devices configured to be inter alia less massive, i.e. statically lighter, may be used for the production process, whereby a significant increase in the production quality can be achieved and considerable potential for reducing costs also arises at the same time.

DESCRIPTION OF EXEMPLARY EMBODIMENTS

Figure 1:
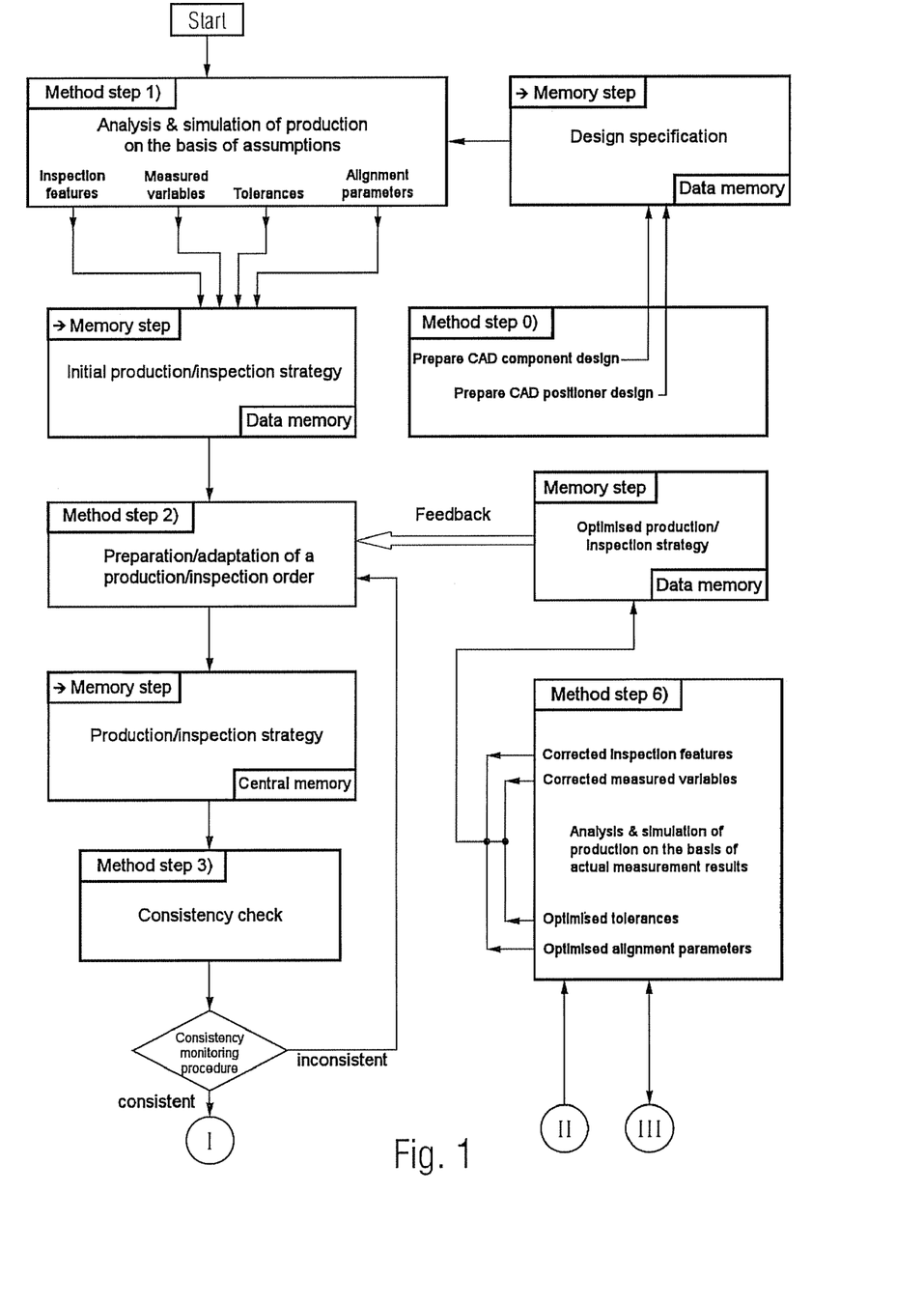
FIG. 1, 2 together illustrate the basic sequence of the method,
FIG. 3, 4 show two examples of an evaluation carried out in method step 5d)

The sequence of the method according to the invention for feedback-based optimisation of the measurement data life cycle during joining processes in production will now be described in further detail with reference to both FIG. 1 and FIG. 2, into which the flow diagram has been divided in order to improve the clarity of the drawings. First, a component design and a positioner design are prepared using known CAD systems in a method step 0) which precedes the method. The component design comprises, for example, geometrical data of the sub-assemblies to be joined together to form a component, while the positioner design comprises, inter alia, geometrical data of the positioning devices used for the joining process in an assembly zone. Accordingly, geometrical data from the joining devices present in the assembly zone can also be stored. The design specification resulting therefrom is stored in a data memory.

The actual method begins in method step 1) with the analysis and simulation of production based on assumptions made on the basis of the design specification produced in method step 0), from which design specification inspection features, measured variables, tolerances and alignment parameters are derived, which may relate, for example, to the sub-assemblies to be joined together, the positioning devices in the assembly zone and the joining devices in the assembly zone. Said variables can be analysed and simulated by suitable statistical methods, for example by means of the "Monte Carlo" method. In a memory step (not described in further detail), the inspection features, measured variables, tolerances and alignment parameters resulting from method step 1) are stored in a data memory of a superordinate computer unit as an initial production and inspection strategy.

In the subsequent method step 2), the allocation and/or adaptation of a production and/or inspection order are derived from the initial production and/or inspection strategy. In a memory step the allocated and/or adapted production and/or inspection order is stored in a central memory of the superordinate computer unit, for example.

In method step 3), after storage in a central memory of the computer unit, the production and/or inspection order resulting from method step 2) is subjected to a consistency check, i.e. a plausibility check. If the production and/or inspection order is inconsistent, the method sequence returns to method step 2) in a consistency monitoring procedure until the desired consistency is achieved.

In the subsequent method step 4), the production and/or inspection order is exported and stored in a data memory of the computer unit in a downstream memory step.

The subsequent method step 5) takes place substantially in an assembly zone. In a method step 5a) subordinate to method step 5), a physical measurement of the sub-assemblies is firstly carried out using known technical devices, for example a laser tracker and/or photogrammetrical methods. The metrological measured variables resulting from method step 5) are stored in the data memory of the computer unit in a subsequent memory step. Following method step 5a) is a memory step in which these measured metrological data are stored or buffered in the data memory of the computer unit.

In a method step 5b), the metrological measured variables are evaluated. The measurement result arising therefrom is evaluated in a variance comparison carried out in method step 5c). The alignment parameters and the measured variables from the production and/or inspection order stored in the data memory in method step 4) are also taken into account in this variance comparison. The variance comparison carried out in method step 5c) results in a measurement deviation.

This measurement deviation is assessed in a further method step 5d). This assessment further incorporates tolerances of the production and/or inspection order stored in the data memory in method step 4). The assessment of the measurement deviation in method step 5d) yields production data which are once again stored in the data memory of the computer unit in a memory step. In method step 5e), a plausibility check of the imported production data is carried out and stored in a central memory of the computer unit.

Downstream of method step 5d) is a tolerance monitoring procedure in which it is decided whether tolerances are met or exceeded.

If tolerances are met after final alignment of the sub-assemblies, the joining process is stable, which leads to the end of the method. However, if the tolerance monitoring procedure shows that tolerances are exceeded, the number of defined iterations is assessed in method step 5g). An iteration monitoring procedure follows method step 5g). Once this iteration monitoring step has been carried out, the method sequence branches depending on whether an increment n of the previous iterations is less than or equal to a constant X or whether the increment n is greater than the constant X, the constant X standing for a predetermined maximum number of method cycles.

If the increment n is less than or equal to the predetermined constant X, method step 5g) is followed by method step 5f), in which the sub-assemblies located in the assembly zone can be (re)aligned to create the finished component. The spatial alignment of the sub-assemblies in the assembly zone can be carried out for example in an automated manner using positioning devices controlled by the computer unit. Once the sub-assemblies to be joined together in the assembly zone have been realigned in method step 5f), the method sequence continues with method step 5a).

However, if the increment n is greater than the predetermined constant X, the course of the method is interrupted after completion of the iteration monitoring procedure and continued with method step 6). In method step 6), production is analysed and simulated on the basis of the actual measurement results determined in method step 5b). The corrected inspection features and measured variables resulting therefrom, as well as the optimised tolerances and alignment parameters, are stored in the data memory of the computer unit as an optimised production and/or inspection strategy in a further interposed memory step. This optimised production and/or inspection strategy located in the data memory is then fed back to method step 2) by completing preparation and/or adaptation of a production and/or inspection order, the method sequence being continued simultaneously. The analysis and simulation of production, resulting from method step 6), based on the actual measurement results is finally compared with a production history located in the central memory (cf. FIG. 1).

Figure 3:
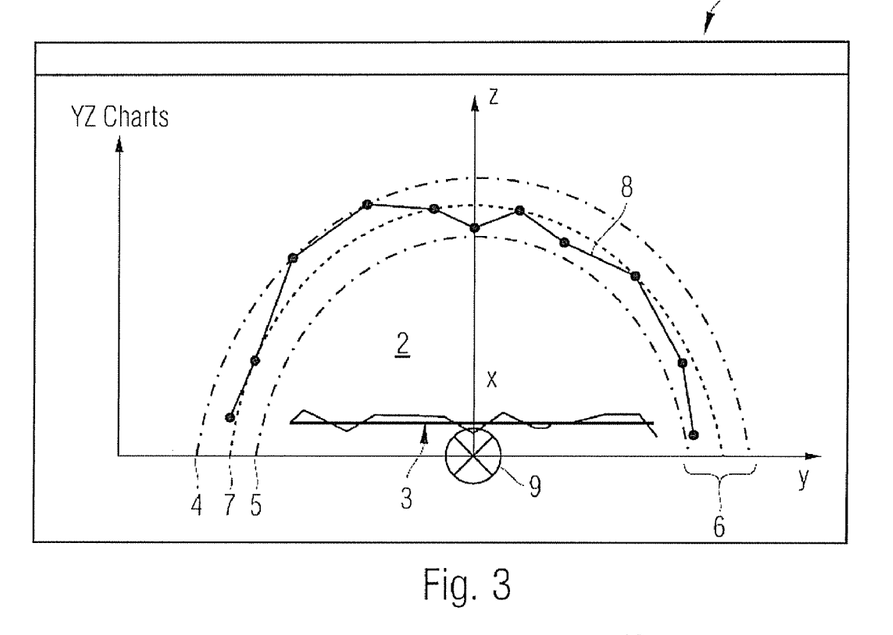

FIG. 3 shows a screen mask 1 of one of a plurality of possible results of the assessment, carried out in method step 5d), of a measurement deviation using the example of a fuselage section 2 (the upper half of a section is shown) comprising a floor structure 3 received therein, the fuselage section 2 in turn being formed using at least two side shells (not shown) and an upper shell (also not shown).

Two semicircles 4, 5 shown by a dot-dash line delimit a tolerance interval 6, in that a cross-sectional contour of the fuselage section 2 can move, for example in order to be able to attach further fuselage sections (not shown) to the fuselage section 2 in a quality-compliant manner. A semicircle 7 shown by a dotted line reflects the ideal characteristic (desired state) of a cross-sectional contour of the fuselage section 2. A further curve characteristic 8 shown by a solid line illustrates the actual characteristic (actual state) of the cross-sectional contour of the fuselage section 2. The screen mask according to FIG. 2 clearly shows that the actual state of the fuselage section 2 lies in the predetermined tolerance interval 6 and thus meets the quality requirements. The tolerance deviations with respect to the floor structure 3 are not dealt with in further detail in this context.

Figure 2:
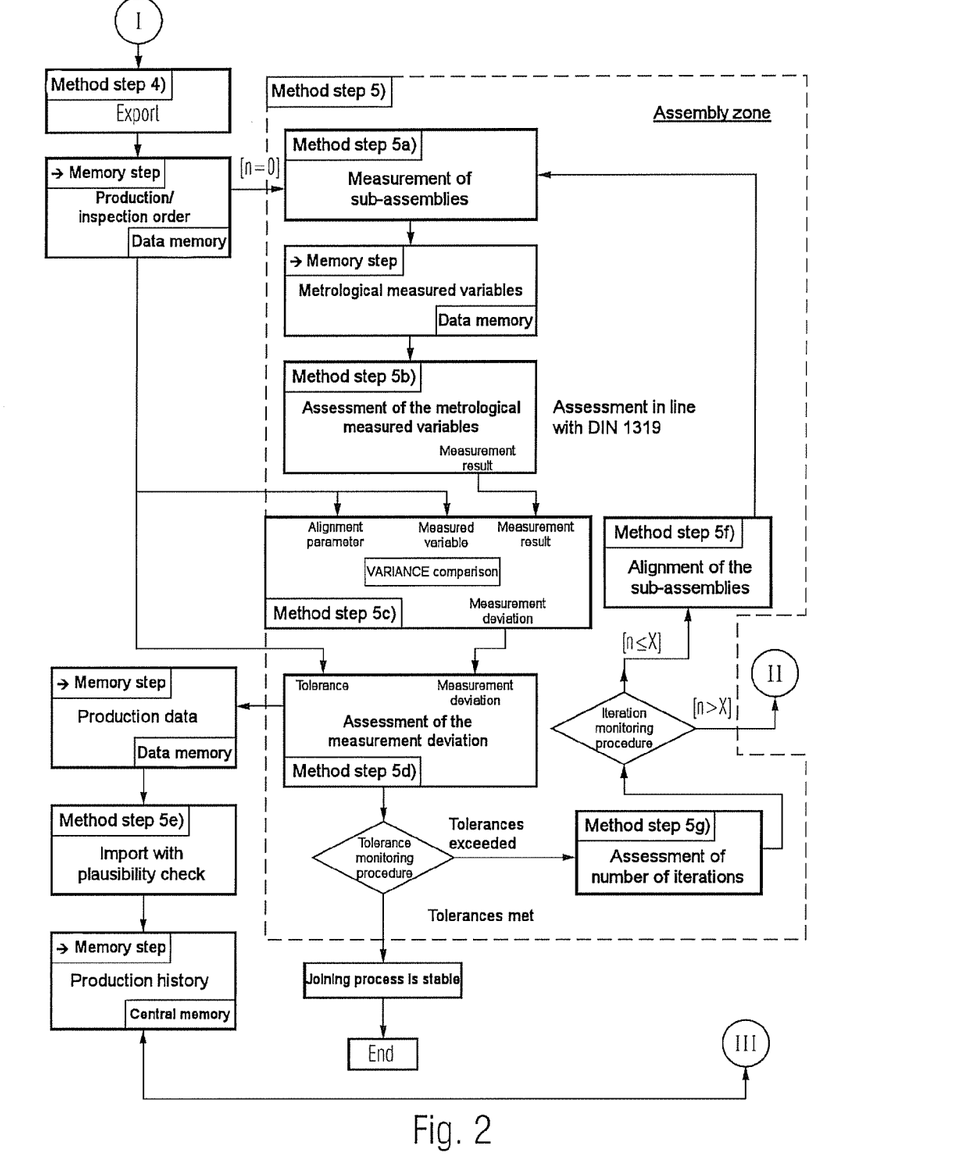

FIG. 2 also shows a coordinate system 9, the x-, y- and z-axes of which symbolise the three spatial directions. In accordance with the definition, the x-axis extends parallel to the imaginary flight direction, while the y-axis as viewed in the flight direction extends transverse to the x-axis and the z-axis extends upwards from an imaginary substrate.

Figure 4:
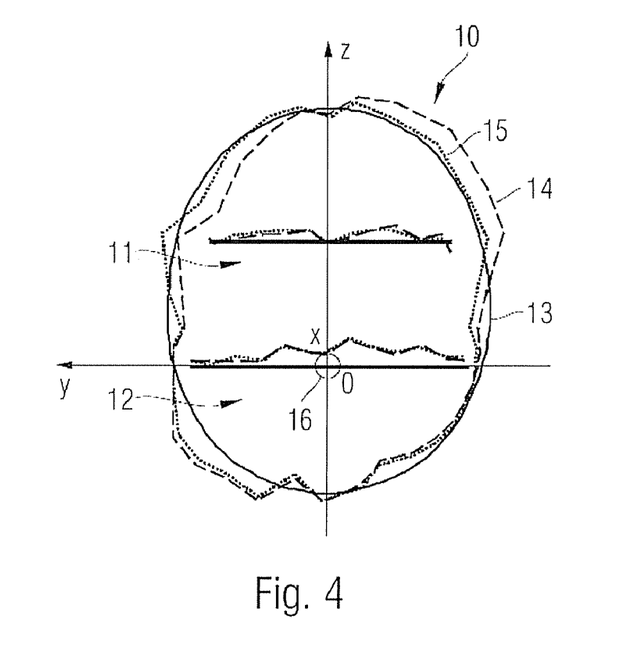

FIG. 4 shows a partial aspect of the method using the example of an alignment of a fuselage section in relation to a further component (not shown), for example a fuselage section to be attached.

Two floor structures 11, 12 are received in a fuselage section 10. A curve characteristic 13 shown by a solid line symbolises the ideal characteristic, i.e. a desired state of the contour characteristic of the fuselage section 10. A further curve characteristic 14 shown by a dashed line reflects the achieved actual state of the cross-sectional contour of the fuselage section 10 after an iteration cycle, while a dotted curve characteristic 15 shows the state of the fuselage section 10 after a second cycle. It can clearly be seen that the fuselage section 10 is considerably closer to the desired state, shown by the solid line, of the cross-sectional geometry after only two cycles of the alignment step 5f). In this state, the generally four shell segments (not shown individually in FIG. 4) could be riveted and/or bolted together and to the floor structures 11, 12 to create the complete fuselage section 10, which is done in the assembly zone (not shown), for example using fully automated riveting robots. In contrast, after just one cycle of the alignment step 5f) according to the invention in the assembly zone no riveting can yet take place owing to the clearly visible dimensional differences. Accordingly, the two iteration cycles for the two floor structures 11, 12 are each shown by a dot-dash line (not provided with a reference numeral), while the respective desired state is indicated by a solid, straight, horizontal line in each case.

Sufficient convergence towards a predetermined desired state of the cross-sectional geometry of the fuselage section 10 can be shown on a monitor by a red or green traffic light signal, for example in a screen mask for displaying further comparison results. A coordinate system comprising an x-axis, a y-axis and a z-axis shows the spatial position of the fuselage section 10 and of the two floor structures 11, 12, the zero point (origin of the coordinate system 16) lying at the common intersection point of the x-axis, the y-axis and the z-axis.

Figure 5:
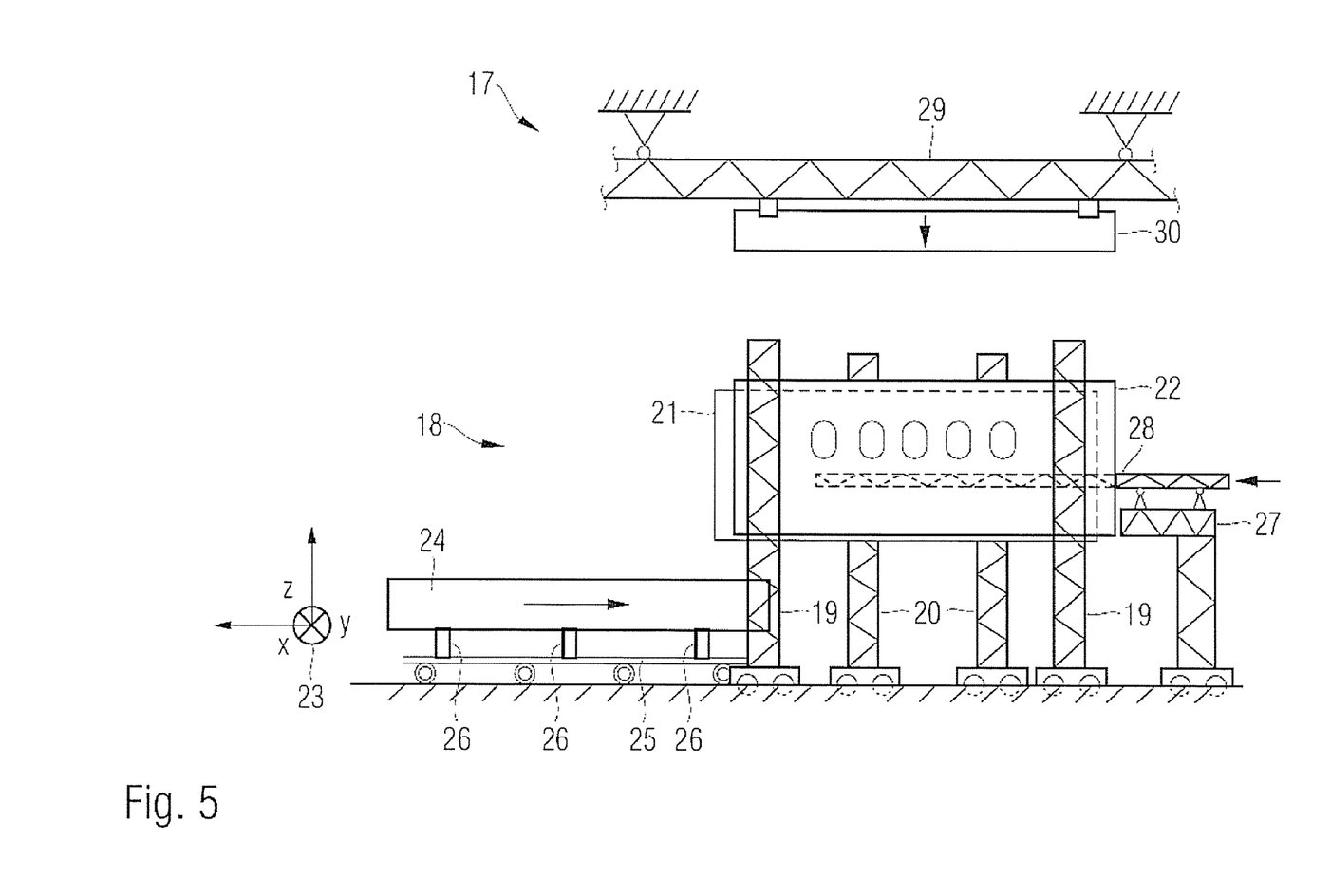
FIG. 5 is a schematic illustration of an assembly zone in which method steps 5a-f) are carried out.

FIG. 5 is a schematic side view of an exemplary embodiment of an assembly zone for carrying out the method, in particular method steps 5a) to 5f).

An assembly zone 17, preferably configured as a combined alignment and joining assembly zone, for manufacturing a fuselage section 18 in a four-shell construction comprises, inter alia, two side shell positioners 19, 20 with which two side shells 21, 22 can be freely moved and aligned spatially.

The side shells 21, 22 can be received by the side shell positioners 19, 20 by means of connecting members (not shown), preferably in an automated manner, and can be fixed in place on said positioners. A coordinate system 23 comprising an x-axis, a y-axis and a z-axis shows the position of all components of the assembly zone 17 in three dimensions. The alignment of the three orthogonal axes of the coordinate system 23 corresponds in this case to the alignment of the axes of the coordinate systems in FIG. 3, 4. The side shell positioners 19, 20 and with them the side shells 21, 22 can be moved parallel to the axes of the coordinate system 23 by means of actuators (not shown in greater detail). In addition, the side shell positioners 19, 20 can optionally also be formed such that they can pivot about at least one spatial axis of the coordinate system 23.

A lower shell 24 is brought into the assembly zone 17 and aligned by means of a lower shell positioner, for example in the form of an underfloor conveyor vehicle 25. In this case the lower shell 24 is located on a "block" 26 on the underfloor conveyor vehicle. The underfloor conveyor vehicle 25 makes possible at least one positioning of the lower shell 24 parallel to the three axes of the coordinate system 23, but it can optionally also have at least one pivot axis. The lower shell 24 can also be automatically fixed on and released from the block 26 by means of attachment members (not shown).

The assembly zone 17 also has a presentation frame 27 for positioning and bringing at least one floor structure 28 into the fuselage section 18. An upper shell positioner 29 for aligning an upper shell 30 completes the equipment of the assembly zone 17. Both the presentation frame 27 and the upper shell positioner 29 make it possible to position the upper shell 30 and the floor structure 28 respectively parallel to each axis of the coordinate system 23. Both the upper shell positioner 29 and the presentation frame 27 have automatically operable attachment members which make it possible to fix in position and optionally also release the floor structure 28 and the upper shell 30 in an automated manner. The side shells 21, 22, the lower shell 24, the floor structure 28, the upper shell 30 as well as the fuselage section 18 to be assembled or integrated therefrom represent the sub-assemblies within the meaning of the method sequence shown in FIG. 1.

The side shell positioners 19, 20, the upper and lower shell positioners 29 and the presentation frame 27 represent positioning devices which make it possible to align spatially the sub-assemblies to be joined in the assembly zone in an automatic and nearly free manner.

Joining devices (not shown in FIG. 5), for example riveting, bolting, adhesive bonding and/or welding robots, are also provided in the region of the assembly zone 17 and can be provided using automatic handling robots, such as standard articulated robots having a plurality of degrees of freedom and/or gantry robots.

Measuring devices (not shown), for example laser trackers, photogrammetrical devices and/or also manually operated measuring devices, are additionally provided in the assembly zone 17 in order to generate measured values which can generally be evaluated directly electronically and further processed, and which are necessary for carrying out the method.

All the movement sequences of the two side shell positioners 19, 20, the underfloor vehicle 25 with the lower shell received on the block 26 and the upper shell positioners 29 within the assembly zone 17 are preferably controlled by at least one control and/or adjustment device subordinate to the superordinate computer unit. In addition, two accessible working platforms (not shown) which can be freely positioned spatially may be provided, one on each side of the upper shell 29 of the fuselage section 18. These working platforms facilitate manual interventions during the production process and in a simple manner make it possible to carry out manual finishing operations, for example.

The method according to the invention makes it possible, in particular by means of the feedback provided, gradually to optimise the manufacturing process of large-scale components. In this case, the method is not to be regarded as being limited to application in joining processes in the field of section assembly during aircraft construction, as shown schematically in FIG. 5. Rather, there are a great number of possibilities for implementation in the field of general mechanical engineering, in the field of aircraft construction, shipbuilding, special machine construction and during the manufacture of wind turbines.

LIST OF REFERENCE NUMERALS

| | |
|---|---|
| 1 | screen mask |
| 2 | fuselage section |
| 3 | floor structure |
| 4 | semicircle ⎫ tolerance interval |
| 5 | semicircle ⎭ |
| 6 | tolerance interval |
| 7 | semicircle (desired state) |
| 8 | curve characteristic (actual state) |
| 9 | coordinate system |
| 10 | fuselage section |
| 11 | floor structure |
| 12 | floor structure |
| 13 | curve characteristic (cross-sectional contour desired state) |
| 14 | curve characteristic (1. actual state cycle) |
| 15 | curve characteristic (2. actual state cycle) |
| 16 | coordinate system |
| 17 | assembly zone |
| 18 | fuselage section |
| 19 | side shell positioner |
| 20 | side shell positioner |
| 21 | side shell |
| 22 | side shell |
| 23 | coordinate system |
| 24 | lower shell |
| 25 | underfloor conveyor vehicle |
| 26 | block |
| 27 | presentation frame |
| 28 | floor structure |
| 29 | upper shell positioner |
| 30 | upper shell |

The invention claimed is:

1. A method for feedback-based optimisation of a measurement data life cycle in joining processes during production, in particular in the manufacture of aircraft and in general mechanical engineering, comprising:
   1) analysing and simulating production on the basis of assumptions, in particular on the basis of production data, in order to prepare an initial production strategy and/or inspection strategy,
   2) preparing and/or adapting a production and/or inspection order,
   3) checking the production and/or inspection order for consistency,
   4) exporting and storing the production and/or inspection order,
   5) aligning and/or joining a component made of at least two sub-assemblies in an assembly zone,
   6) analysing and simulating production on the basis of actual measurement results and feedback of an optimised production and/or inspection strategy into the preparing and/or adapting a production and/or inspection order, and
   7) at least one repetition of method steps 2) to 6),
      wherein in a method step 5a), the sub-assemblies are measured and metrological measured variables obtained therefrom are stored;
      wherein in a method step 5b), the metrological measured variables obtained in method step 5a) are evaluated,
      wherein in a method step 5c), a variance comparison is carried out between stored alignment parameters and measured variables, and the metrological measured variables evaluated in method step 5b) to determine a measurement deviation,
      wherein in a method step 5d), the measurement deviation determined in method step 5c) is compared with stored tolerances to assess the measurement deviation,
      wherein in a method step 5e), the assessment of the measurement deviation determined in method stop 5d) yields production data which is imported into a production history in a method step 5e) after a plausibility check has been carried out,
      wherein in a method step 0), a component design and/or a positioner design are prepared using at least one CAD system, the designs being stored as design specifications; and
      wherein the design specifications from method step 0), the production data determined in method step 1), the production and/or inspection orders resulting from method step 4), the metrological measured variables measured in method step 5a), the production data obtained from method step 5d), and the optimised production and/or inspection strategy resulting from method step 6) are stored in at least one data memory in a respective memory step and the production and/or inspection orders are generated in method step 2), the production history generated in method step 5e) and the analysis and simulation of production generated in method step 6) on the basis of actual measurement results are stored in at least one central memory in a respective memory step, it being possible to retrieve the at least one data memory and/or the at least one central memory locally.

2. The method according to claim 1, wherein the production data includes inspection features, measured variables, tolerances and alignment parameters.

3. The method according to claim 1, wherein the optimised production and/or inspection strategy is stored in a memory step between method step 6) and method step 2).

4. The method according to claim 1, wherein in method step 3) a consistency check is carried out, method step 2) being repeated if an inconsistency is found.

5. The method according to claim 1, wherein in a tolerance monitoring step tests are carried out to determine whether the tolerances are met, the method ending if tolerances are met and continuing with a method step 5g) for assessing the number n of iterations if tolerances are exceeded.

6. The method according to claim 5, wherein in an iteration monitoring procedure following method step 5g) an increment n of the previous iterations are evaluated in such a way that the at least two sub-assemblies are realigned in a method step 50 and method step 5a) is then repeated if the increment n is less than or equal to a constant X, or in that the method is continued with method step 6) if the increment n is greater than the constant X, the constant X corresponding to a predetermined maximum number of iterations to be carried out.

7. The method according to claim 6, wherein the at least two sub-assemblies, in particular at least two side shells, at least one upper shell, at least one lower shell and at least one floor structure, are aligned in an assembly zone using at least one positioning device in each case as a function of the tolerance monitoring procedure and method step 5g) and are joined together using at least one joining device.

8. The method according to claim 6, wherein in method step 6) production is analysed and simulated on the basis of actual measurement results; wherein corrected inspection features resulting from the analysis and simulation in method step 6), as well as measured variables and/or optimised tolerances and alignment parameters forming the optimised production and/or inspection strategy, are fed back to the preparation and/or adaptation of the production and/or inspection order carried out in method step 2) for the continuous improvement of the production process.

9. A device, in particular for carrying out the method for feedback-based optimisation of a measurement data life cycle, in particular in the manufacture of aircraft and in general mechanical engineering, according to claim 8, including:
  a) at least one assembly zone,
  b) at least one positioning device for aligning the at least two sub-assemblies,
  c) at least one joining device for joining the at least two sub-assemblies,
  d) at least one control and/or adjustment device for controlling the at least one positioning device and/or the at least one joining device as a function of corrected inspection features resulting therefrom, and
  e) at least one computer unit which is superordinate to the at least one control and/or adjustment device and comprises at least one processor, at least one data memory and at least one central memory.

10. The device according to claim 9, wherein at least one sub-assembly is in particular a side shell, an upper shell, a lower shell and/or a floor structure, the component to be produced comprising at least one further sub-assembly, in particular at least one other of said components.

11. The device according to claim 9, wherein the at least one positioning device is in particular a side shell positioner, an upper shell positioner, a lower shell positioner formed as an underfloor conveyor vehicle or a floor structure positioner configured as a presentation frame.

* * * * *